United States Patent [19]

Jessee

[11] Patent Number: 4,502,105
[45] Date of Patent: Feb. 26, 1985

[54] INVERTER FIRING CONTROL WITH PULSE AVERAGING ERROR COMPENSATION

[75] Inventor: Ralph D. Jessee, Shawnee Township, Allen County, Ohio

[73] Assignee: Westinghouse Electric Corp., Pittsburgh, Pa.

[21] Appl. No.: 490,080

[22] Filed: Apr. 29, 1983

[51] Int. Cl.³ ............................................. H02M 1/12
[52] U.S. Cl. ...................................... 363/41; 363/98; 363/132
[58] Field of Search .................................. 363/40–43, 363/55–58, 96–98, 131–139

[56] References Cited

U.S. PATENT DOCUMENTS

| | | | |
|---|---|---|---|
| 3,649,902 | 3/1972 | Dunbar | 363/41 |
| 3,710,229 | 1/1973 | Jessee | 363/41 |
| 3,715,649 | 2/1973 | Ravas | 363/42 |
| 3,958,171 | 5/1976 | Sekino | 363/41 |
| 3,967,173 | 6/1976 | Stich | 363/132 |
| 4,166,247 | 8/1979 | Miyazawa | 363/41 X |
| 4,179,727 | 12/1979 | Muto et al. | 363/96 X |
| 4,228,491 | 10/1980 | Abraham et al. | 363/41 |
| 4,291,368 | 9/1981 | Yarema et al. | 363/41 |
| 4,443,842 | 4/1984 | Jessee | 363/41 |

Primary Examiner—Peter S. Wong
Attorney, Agent, or Firm—R. P. Lenart

[57] ABSTRACT

A pole switch firing control for a pulse width modulated inverter controls pole switch operation under steady state operating conditions such that the inverter output duplicates a reference signal waveform after a fixed time delay. Average pole switch operating time for a given pulse in an inverter output cycle is measured by obtaining an average number of clock pulses which occur during the delay time of the associated pole switch for a given number of preceding inverter output cycles. This average count then serves as a starting point for a presettable counter which begins to count upon the occurrence of a transition point in the reference waveform. When the presettable counter reaches a preselected count, the pole switch operating cycle is initiated, thereby causing the pole switch to operate at a fixed time following a transition point in the reference signal.

11 Claims, 4 Drawing Figures

INVERTER FIRING CONTROL WITH PULSE AVERAGING ERROR COMPENSATION

BACKGROUND AND SUMMARY OF THE INVENTION

This invention relates to electrical inverters and more particularly to circuits for controlling power pole switching in pulse width modulated inverters.

Pulse width modulated DC-to-AC inverters approximate sine wave outputs by switching power pole switches at a rate higher than the fundamental sine wave frequency of the AC output. In the design of pulse width modulated DC-to-AC inverters, it is desirable to switch the power stage in a manner which reduces certain harmonics to low values so as to ease the burden of filtering the output power to obtain a sinusoidal voltage wave. Fairly small errors in switching times can produce harmonic voltages many times greater than desired. This usually results in the circuit filter being made considerably larger than theoretically necessary to suppress these harmonics.

In a transistor inverter, for example, it is necessary to provide an underlap condition to prevent shoot-through during the switching operation. This means that to switch an output point from one polarity to another, there must be a delay after the conducting transistor is turned off, to be sure it is no longer conducting, before the other transistor is turned on. Many times load conditions are such that the second transistor does not conduct at all since load current is shunted through a commutating diode, thereby shortening the switching time to that of the transistor turn-off time. The transistor switching time is quite variable depending on the instantaneous load current as well as the transistor turn-off characteristic. Therefore, the prescribed switching schedule may not be met, resulting in unpredicted harmonics.

The present invention minimizes output distortion due to switching errors by predicting the switching time required for each switching point and using this prediction to adjust the starting time for each switching period so that switching is accomplished on schedule. In general, a reference waveform which is to be reproduced at the power pole output will be available to the switching control circuitry. Pulses within the reference wave are to be reproduced at the power pole output after a preselected time interval. This delayed switching schedule is accomplished by measuring the power pole switching time for a plurality of inverter output pulses, averaging the measured switching times, and subtracting the average of these switching times from the preselected time interval to obtain a firing time period. The switching period for the corresponding pulse in the succeeding output cycle is then initiated at a point equal to the firing time period, as obtained from the average of the measured cycles, following a transition point in a reference waveform pulse. This process is repeated for each power pole output pulse. During steady state operation, it is reasonable to expect that switching periods will be the same length at corresponding switching points in each subsequent cycle. Therefore, the power pole will switch after a preselected time interval following the reference wave pulses.

A circuit which performs a similar delayed pole switching function, but without an averaging feature, is disclosed in my copending application, Ser. No. 355,073, filed Mar. 5, 1982 and entitled "Inverter Firing Control With Compensation for Variable Switching Delay", now U.S. Pat. No. 4,443,842. That application discloses a circuit and method for eliminating distortion in inverters caused by variability in switching delays of power poles, and is hereby incorporated by reference. Although tests of the circuit described in that application confirmed the operation as described, random instabilities occurred causing momentary disturbances in the output voltage of the inverter. An additional one of my copending applications, Ser. No. 490,261, filed concurrently with this application, and entitled "Inverter Firing Control With Error Compensation" also discloses a circuit which performs a delayed pole switching function without the averaging feature and is hereby incorporated by reference. This second application discloses a circuit which eliminates the need for a comparator circuit and ensures that only complete clock pulses are counted during the timing intervals.

A pole switch firing control circuit for controlling a pulse width modulated inverter constructed in accordance with this invention comprises: means for receiving a clock signal containing voltage pulses; means for generating a control signal having transition points for initiating a pole switch switching sequence in the inverter; a first counter, being presettable to start counting from a supplied number, for counting the number of clock voltage pulses which occur between a selected transition point in the control signal and the switching point of an associated pole switch and for dividing the counted number by a preselected number N to obtain an approximate average count equal to the sum of the supplied number and the counted number of clock pulses divided by N; means for storing the approximate average count counted by the first counter; means for generating the supplied number wherein the supplied number is equal to a selected previous approximate average multiplied by the factor $(N-1)/N$; and a second counter, being presettable to start counting at a selected previous approximate average count, and connected to count clock voltage pulses which occur after a preselected transition point in the reference signal until a preselected count has been reached, whereupon the second counter produces a carry output signal pulse which causes the means for generating a control signal to create a second transition point in the control signal to initiate a second pole switch switching sequence in the inverter. The sum of the number supplied to the first counter and the number of clock pulses which it counts divided by N, is equal to an approximate average of the number of clock pulses which have occurred during the preceding N switching cycles of the pole switch.

By appropriately timing the switching function, multiple phase inverters can be controlled by a single control circuit. The means for storing approximate average counts may be a shift register which stores the approximate average counts generated by the first counter during each switching sequence and delivers the appropriate stored approximate average count to the second presettable counter at an appropriate time to produce the desired inverter output wave form.

The circuit of this invention controls a switching of a power pole switch in a pulse width modulated inverter in accordance with a method comprising the steps of: measuring the switching time of a power pole switch for a polarity of switching cycles; averaging the measured switching delay time; subtracting the resulting average switching delay time from a preselected fixed time interval to obtain a firing time period; and initiating a switching sequence for the pole switch after a time equal to the firing time period following a transition point in a reference pulse signal.

DESCRIPTION OF THE PREFERRED EMBODIMENTS

Figure 1:
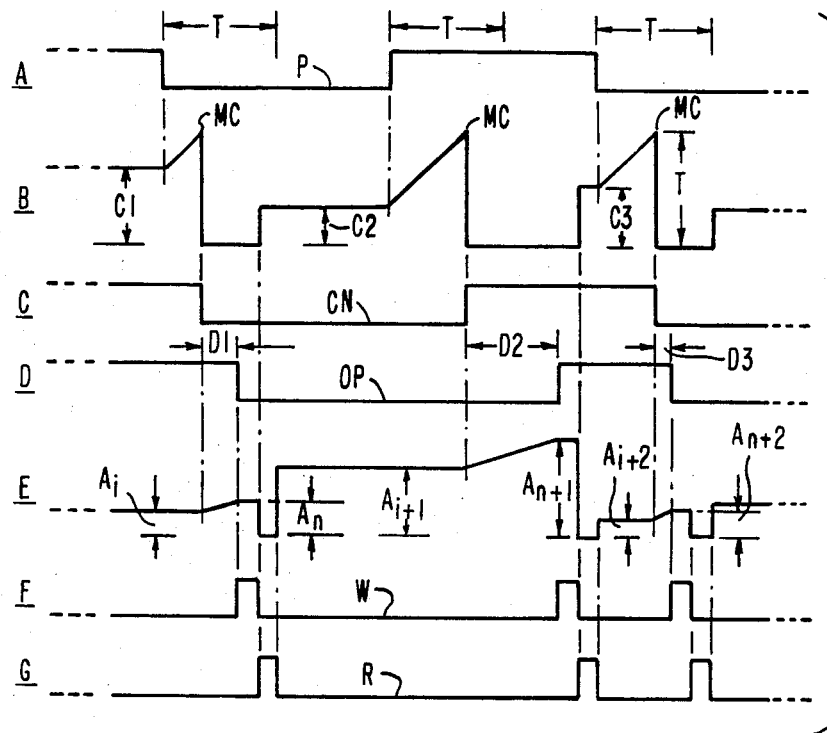
FIG. 1 is a series of waveforms illustrative of the function of an inverter firing control in accordance with the present invention, during a transient cycle of the inverter.

Referring to the drawings, the waveforms of FIG. 1 illustrate the operation of the inverter firing control method and apparatus of this invention for a single output transient cycle of a pulse width modulated inverter. Waveform A of FIG. 1 shows a pulse wave P which is part of a reference signal that is to be reproduced at the inverter power pole output. The reference signal may be generated within the inverter firing control circuitry or may be received from a external source. A fixed time interval T is shown with respect to each transition point of pulse wave P. This invention acts to make the inverter power pole switch at the end of each period T, thereby causing the inverter output to reproduce the reference signal. To maintain proper firing control function, time interval T must be at least as long as the maximum switching time; of the power pole switch.

Waveform B of FIG. 1 represents an accummulated number of clock pulses counted by a presettable counter having a preset number of counts, for example, C1, C2 and C3, and being enabled to count following a transition point in reference pulse wave P. The preset number of counts C1, C2 and C3, are equal to an approximate average number of clock voltage pulses which have occurred during a plurality of switch operating times of an associated power pole switch. The presettable counter has a maximum count MC which corresponds to the desired delay time T.

Waveform C of FIG. 1 illustrates a control signal CN which responds to the count of the presettable counter by including a transition point each time the maximum count MC is achieved. These transition points are used to initiate the power pole switching sequence of the inverter. During steady state operation, it is reasonable to expect that the switching times of each power pole will be approximately the same length as the averaging switching times measured during a plurality of preceding switching cycles. Therefore, if a switching sequence is initiated after a firing time period, which is equivalent to the difference between the fixed time interval T and the average switching delay time, the actual switching should occur after a full time interval T.

The means used to achieve this result are illustrated by the other waveforms of FIG. 1. Waveform D shows output signal OP which represents the inverter output pole voltage. Switching delays D1, D2 and D3 are indicated following each transition of control signal CN. Waveform E of FIG. 1 is the accumulated count in a time keeper counter which measures average switching time of an associated power pole. The average of a sequence of N data points, which in this case is a series of counts corresponding to switching delay times for a given power pole switch in N previous inverter output cycles, may be expressed as:

$$A_1 = (d_1 + d_2 + \ldots + d_N)/N \quad (1)$$

where data point $d_1$ is the number of clock voltage pulses counted during delay D1 in a selected inverter output cycle, $d_2$ is the number of pulses counted during a corresponding delay D1' in the next output cycle, and $d_N$ is the number of pulses counted during a corresponding delay in the last output cycle. The average of the next group of N points is obtained by replacing the oldest data by the newest in the equation to obtain:

$$A_2 = (d_2 + \ldots + d_N + d_{N+1})/N \quad (2)$$

A significant amount of data storage would be required to keep a true running average. The preferred embodiment of this invention reduces the required data storage by utilizing an approximate average which may be expressed as:

$$A_n = A_{n-1}(N-1)/N + d/N \quad (3)$$

where $A_{n-1}$ is an old approximate average, d is the new data number and N is a weighting factor equal to the number of data points considered in equations (1) and (2). This function is accomplished by a second counter which is presettable to start counting at a count equivalent to a previous approximate average switch operating time and starts to count clock voltage pulses upon the occurrence of a transition point in control signal CN. The number of counts are divided by the number of cycles used to compute the average switching time to obtain an incremental switching count which is added to the preset approximate average switching time, $A_i$, $A_{i+1}$, $A_{i+2}$, leaving a count equivalent to a new approximate average switching time, $A_n$, $A_{n+1}$, $A_{n+2}$, to be used to control the output pulse during the next output cycle. This count is then stored in a memory element such as a random access memory or shift register.

Waveform F of FIG. 1 represents a pulse wave W which causes data from the second counter, needed in the next output cycle, to be entered into the memory element which advances and transfers data appropriate to the next switching operation to the first presettable counter. The number of stages in the memory, which may be a shift register, is equal to the number of power pole switching operations in an inverter output cycle. Waveform G of FIG. 1 represents a pulse wave R which presets the second counter to $(N-1)/N \cdot A_{n-i}$ after its data has been entered into the shift register.

Figure 2:
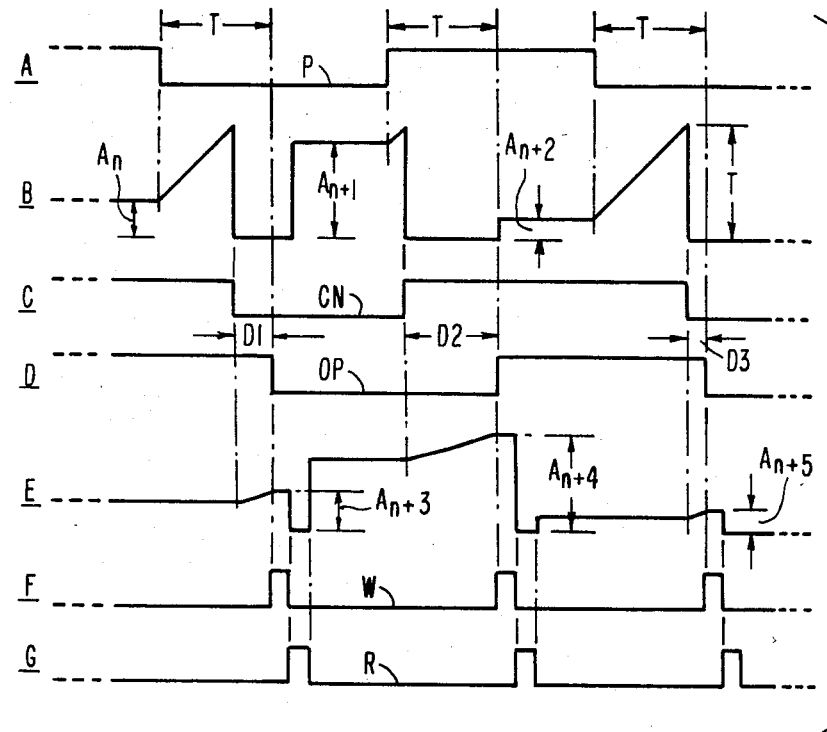
FIG. 2 is a series of waveforms illustrative of the function of an inverter firing control in accordance with this invention, for an inverter output cycle succeeding the output cycle represented by FIG. 1.

The waveforms of FIG. 2 illustrate the function of the invention for an inverter output cycle succeeding the transient output cycle represented by the waveforms of FIG. 1. During this cycle, the transition points of control signal CN are delayed by a time equal to the time required for the first presettable counter to count from its preset value to its maximum count, following a transition point in reference pulse wave P. For steady state operation, the switch operating time for a given pulse in an output cycle should be approximately equal to the approximate average switching time for the corresponding pulse in the previous N cycles. Therefore, the inverter output signal OP switches after a delay D1, which is substantially equal to the average previous switching delays, following the first transition of control signal CN. This results in a switching time substantially equal to fixed time interval T following a transition point of reference waveform P. Under steady state conditions, the process continues for each pulse in the output cycle with the sum of the control signal transition point delays and the switching delays always equal to the fixed time interval T. An examination of the waveforms of FIG. 1 reveals that the output signal OP does not switch after a fixed time interval T following a transition point in the reference pulse wave P. This illustrates the circuit response when a transient condition occurs just prior to the observed sample. When steady state conditions return, the switching schedule will be satisfied.

Figure 3:
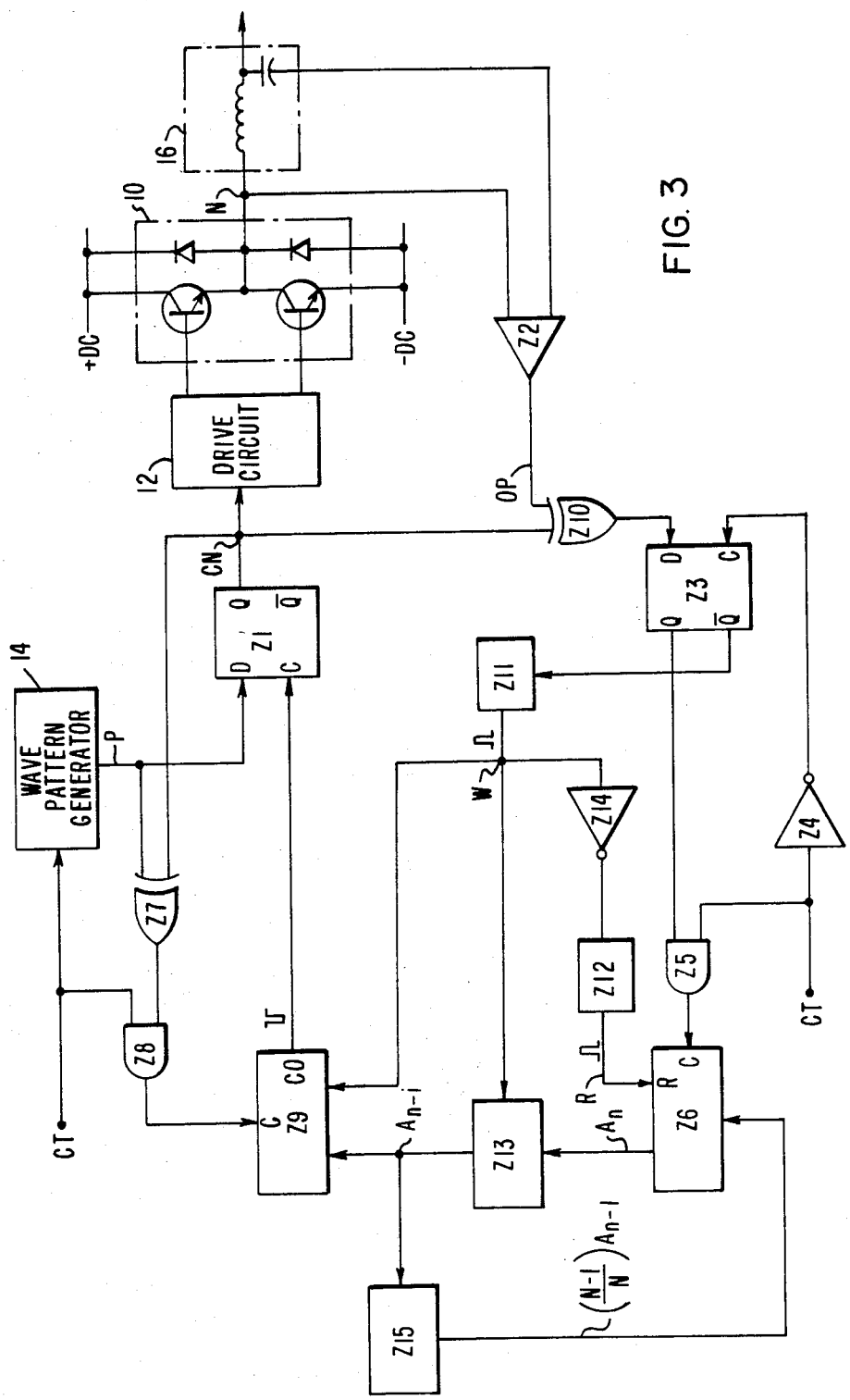
FIG. 3 is a schematic diagram of an inverter firing control circuit constructed in accordance with one embodiment of this invention.

FIG. 3 is a schematic diagram of a firing control circuit in accordance with one embodiment of the present invention. For simplicity, only one power pole switching element 10 is illustrated. However, it should be understood that this invention can be applied to multiple phase inverters through the use of appropriate known drive circuitry. Terminals CT serve as means for receiving a clock signal comprising a series of voltage pulses. The desired output switching pattern represented by pulse wave P is developed in waveform pattern generator 12 in response to the clock pulse signal. Flip-flop circuit Z1, which may be a type D flip-flop as illustrated, serves as means for generating control signal CN having transition points as illustrated in FIGS. 1 and 2. Drive circuit 14 is constructed in accordance with known technology and serves to drive power pole 10 in accordance with control signal CN. Comparator Z2 compares the voltage appearing at point N with a voltage signal taken from filer 16 to produce output signal OP.

The combination of flip-flop circuit Z3, inverter Z4, and AND circuit Z5 insure that only complete clock pulses are applied to a first presettable counter Z6. Flip-flop Z3 transmits an enable signal allowing clock pulses to be received by counter Z6. A change in the signal at the flip-flop D input is transmitted to the Q output only when the clock pulse goes low because of the inverted clock signal at the C input of the flip-flop. If signals at both D and Q are low and the signal at D goes high while the clock pulse is high, the counter input must remain low until Q goes high as a result of the falling clock signal. Thus the counter Z6 can only receive a full first clock pulse. Likewise, should D and Q be high and D go low during a high clock pulse, there can be no change in Q until the clock pulse falls, again ensuring a complete clock pulse at the counter. Although this can result in a full clock pulse period of error in the recorded power pole switching time, this is considered to be insignificant compared to a possible misreading by the counter if it were to count incomplete clock pulses. Thus the addition of flip-flop Z3 ensures correct data transmission to presettable counter Z6 and removes a possible source of erratic operation.

When reference pulse wave P, control signal CN, and output signal OP all agree, the circuit is at rest. When waveform P changes state, causing disagreement with control signal CN, the output of exclusive OR gate Z7 goes high, thereby allowing AND gate Z8 to transmit clock pulses to presettable counter Z9. Z9 counts to a predetermined value, which may be its full capacity, whereupon its carryout signal goes low. On the next clock pulse, all the counter outputs go to zero and the carryout signal rises. This causes flip-flop Z1 to operate and change the state of control signal CN which once again agrees with reference pulse wave P, thereby stopping counter Z9. At this point, control signal CN disagrees with inverter output signal OP.

Two actions are initiated by the occurrence of a transition point in control signal CN. First, drive circuit 14 begins the switching sequence of the inverter power pole. Second, the output of exclusive OR gate Z10 goes high, allowing clock pulses to reach counter Z6 which begins counting at a preset number equal to a previous approximate average number of clock pulses taken over a plurality of cycles multiplied by the factor $(N-1)/N$, where N is the number of preceding cycles used to determine the approximate average. Z6 counts clock pulses until the power pole switch switches and causes a transition in output waveform OP such that OP agrees with control signal CN, thereby inhibiting further counting by counter Z6. Counter Z6 peforms the function of dividing the recently counted clock pulses by the number N and adding this number to the preset approximate average number of clock pulses to obtain a new approximate average number of clock pulses $A_n$ which is transmitted to shift register Z13.

The change in output signal OP also initiates a series of two pulses, generated by monostable multivibrators Z11 and Z12. The output of monostable multivibrator Z11 is the pulse waveform W of FIGS. 1 and 2. This waveform serves to load data from presettable counter Z6 into shift register Z13, which serves as a memory element, and in turn shifts out data to presettable counter Z9, thereby setting presettable counter Z9 to a new data number before the end of a pulse in waveform W. The pulse of waveform W also is inverted by inverter Z14 and transmitted to monostable multivibrator Z12. The output of multivibrator Z12 is a second pulse waveform equal to the waveform R of FIGS. 1 and 2. The pulses in waveform R preset counter Z6 to $(N-1)/N\ A_{n-i}$ so that it is ready to count during the next power pole switching delay of the inverter output cycle. The control system is then at rest until the next transition point in reference pulse wave P. The length of shift register Z13 is such that one data word, representing switching time of a power pole, is stored for each of the switching points in one inverter output cycle. Thus, when current data equal to the approximate average number of clock pulses required for a power pole switching operation just completed is entered into the shift register, the average number required for the next switching point is set into presettable counter Z9. This number represents the average switching time of the power pole at corresponding switching points in N previous inverter output cycles. Thus, when reference pulse wave P next changes, the presettable counter Z9 starts counting at a number representing the anticipated switching delay in the associated power pole and counts to its full capacity. The power pole then switches in a time substantially equal to that of the previous average switching time. The result is that the power pole switching duplicates the reference pulse wave P, but is delayed by a preselected time period T corresponding to the full count of the presettable counter Z9.

Figure 4:
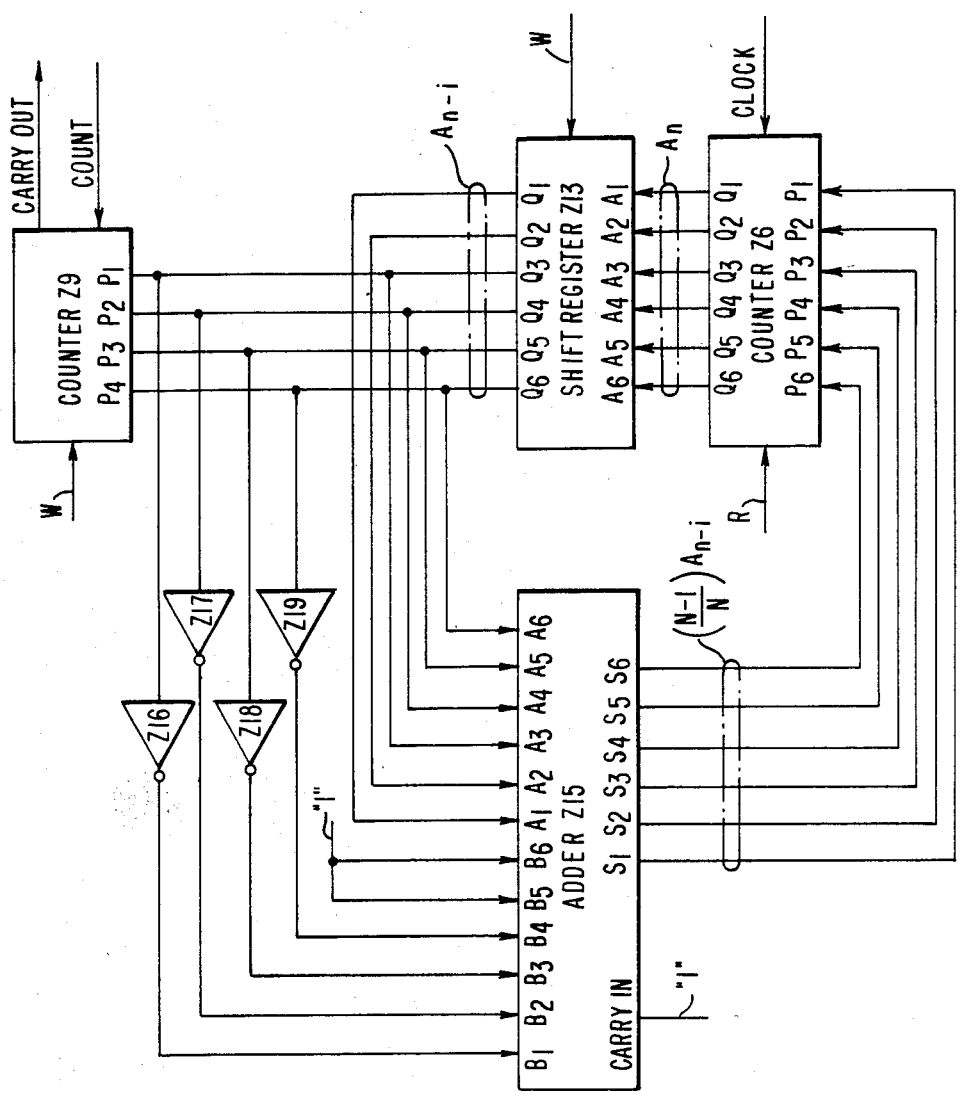
FIG. 4 is a schematic diagram of the averaging portion of the firing control circuit of FIG. 3.

FIG. 4 is a schematic diagram of the averaging circuit of FIG. 3. The circuit of this embodiment produces four bit integers with two bit fractions. Presettable counter Z9 operates from only the integer portion of the data which represents an integral number of clock pulses. The number of fractional bits determines the value of N. In FIG. 4, the use of two fractional bits divides the new data D by four, so that the least significant bit represents one quarter of a clock count. A binary number $A_{n-i}$ representing an approximate average of the counts during a plurality of preceding switching cycles, appears at the output of shift register Z13. The fraction $(N-1)/N$ of the binary number $A_{n-i}$ is derived through the use of a binary adder Z15. The number $A_{n-i}$ is applied to one set of adder inputs, $A_1$ through $A_6$. The complement of the integer portion of binary number $A_{n-i}$, with all bits having been inverted by inverters Z16, Z17, Z18 and Z19, is shifted two places and applied to a second set of adder inputs, $B_1$ through $B_6$. Finally, the adder carry-in input is set at logic 1. Shifting the bits divides by four. Inverting and adding a carry bit subtracts. The adder output is thus $A_{n-i}(N-1)/N$.

Although the present invention has been described in terms of what at present is believed to be the preferred embodiment, it will be apparent to those skilled in the art that various changes and modifications may be made without departing from the scope of the invention. It is therefore intended that the appended claims cover all such changes that fall within the scope of the invention.

What is claimed is:

1. A pole switch firing control circuit for controlling a pulse width modulated inverter in accordance with a reference pulse signal, said control circuit comprising:
    means for receiving a clock signal containing voltage pulses;
    means for generating a control signal having transition points for initiating a pole switch switching sequence in the inverter;
    a first counter, being presettable to start counting from a supplied number, for counting the number of said clock voltage pulses which occur between a selected transition point in said control signal and the switching of an associated pole switch and for dividing the counted number by a preselected number N to obtain an approximate average count equal to the sum of said supplied number and the counted number of clock pulses divided by N;
    memory means for storing the approximate average count counted by said first counter during each pole switch switching sequence;
    means for generating said supplied number wherein said supplied number is equal a selected previous approximate average count multiplied by the factor $(N-1)/N$; and
    a second counter, being presettable to start counting at a selected previous approximate average count, and connected to count said clock voltage pulses which occur after a preselected transition point in said reference signal until a predetermined count has been reached, whereupon said second counter produces a carry output signal pulse which causes said means for generating a control signal to create a second transition point in said control signal, to initiate a second pole switch switching sequence in the inverter.

2. A pole switch firing control circuit as recited in claim 1, further comprising:
    means for transferring the stored approximate average count for a selected pole switch to said second counter when said selected pole switch will be the next pole switch to be fired.

3. A pole switch firing control circuit as recited in claim 2, wherein said memory means comprises a shift register and said means for transferring comprises a one-shot multivibrator connected to the shift input of said shift register.

4. A pole switch firing control circuit as recited in claim 1, wherein said means for generating said supplied number comprises:
    an adder circuit having a first set of inputs connected to receive said selected previous approximate average count in binary form, having a second set of inputs connected to receive the binay complement of a portion of said selected previous approximate average which has ben shifted at least one bit, and having a carry-in input connected to a logic one, whereby the output of said adder circuit is equal to said selected previous approximate average multiplied by the factor $(N-1)/N$.

5. A pole switch firing control circuit as recited in claim 1, wherein said means for generating a control signal comprises a flip-flop circuit.

6. A pole switch firing control circuit as recited in claim 5, wherein said flip-flop circuit comprises:
    a type D flip-flop circuit having a D input connected to receive said reference pulse signal and having a clock input connected to receive said carry output signal.

7. A pole switch firing control circuit as recited in claim 1, further comprising:
    means for providing only complete clock voltage pulses to said first counter.

8. A pole switch firing control circuit as recited in claim 7, wherein said means for providing only complete clock voltage pulses to said first counter comprises:
    an AND gate having its output connected to said first counter and having two inputs with a first of said two inputs being connected to said means for receiving a clock signal;
    a flip-flop circuit having a clock input and a Q output, with said Q output being connected to a second one of said two AND gate inputs; and
    an inverter having an input connected to said means for receiving a clock signal and having an output connected to said flip-flop circuit clock input.

9. A method of controlling the switching of a power pole switch in a pulse width modulated inverter in accordance with a reference pulse signal, said method comprising the steps of:
    measuring the switching time of said pole switch for a plurality of switching cycles;
    averaging the measured switching times;
    subtracting the resulting average switching time from a preselected fixed time interval to obtain a firing time period; and
    initiating a switching sequence for said pole switch after a period equal to said firing time period following a transition point in said reference pulse signal.

10. A method of controlling the switching of a power pole switch in a pulse width modulated inverter in accordance with a reference pulse signal, said method comprising the steps of:
    measuring the switching time of said pole switch for a preselected number of switching cycles N;
    averaging the measured switching times;
    multiplying the resulting average by the factor $(N-1)/N$ to obtain a first time estimate;

measuring the switching time of said pole switch for an additional switching cycle;

dividing the measured switching time of said additional switching cycle by N and adding the resulting product to said first time estimate to obtain an approximate average switching time;

subtracting said approximate average switching time from a preselected fixed time interval to obtain a firing time period; and initiating a switching sequence for said pole switch after a period equal to said firing time period following a transition point in said reference signal.

11. A method of controlling the switching of a power pole switch in a pulse width modulated inverter in accordance with a reference pulse signal, said method comprising the steps of:

counting a series of clock pulses, which occur between a preselected transition point in a control signal and the switching of a power pole switch in response to said transition point, with a first counter;

dividing the number of clock pulses, counted by said first counter, by a preselected number N to obtain an incremental count;

adding said incremental count to an approximate average number of clock pulses counted by said first counter in the preceding N switching cycles of said power pole switch to obtain a new approximate average count;

presetting a second counter at a count equal to said new approximate average count;

operating said second counter to count clock pulses, beginning at said new approximate average count, when a preselected transition point occurs in a reference signal; and causing a second transition point in said control signal to occur when said second counter reaches a predetermined count, thereby initiating a switching operation in said power pole switch.

* * * * *